(12) United States Patent
Roberts et al.

(10) Patent No.: US 11,592,973 B2
(45) Date of Patent: Feb. 28, 2023

(54) GOAL-BASED DYNAMIC MODIFICATIONS TO USER INTERFACE CONTENT

(71) Applicant: PAYPAL, INC., San Jose, CA (US)

(72) Inventors: Gwendolyn Phelan Roberts, San Jose, CA (US); Vladimir Bacvanski, Portola Valley, CA (US); Michael Charles Todasco, Santa Clara, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/159,750

(22) Filed: Jan. 27, 2021

(65) Prior Publication Data

US 2022/0236864 A1 Jul. 28, 2022

(51) Int. Cl.
*G06F 3/0482* (2013.01)
*G06F 3/04845* (2022.01)
*H04L 67/02* (2022.01)
*H04L 67/306* (2022.01)

(52) U.S. Cl.
CPC ........ *G06F 3/04845* (2013.01); *G06F 3/0482* (2013.01); *H04L 67/02* (2013.01); *H04L 67/306* (2013.01)

(58) Field of Classification Search
CPC ............... G06F 16/9535; G06F 16/248; G06F 16/9536; G06F 16/435; G06F 16/438; G06F 3/04845; G06F 3/0482; H04L 67/02; H04L 67/306
See application file for complete search history.

(56) References Cited

U.S. PATENT DOCUMENTS

| | | | |
|---|---|---|---|
| 9,881,332 B2 | 1/2018 | Bloem et al. | |
| 10,592,570 B2 | 3/2020 | Li et al. | |
| 10,614,139 B2 | 4/2020 | Fujioka et al. | |
| 2006/0074883 A1 | 4/2006 | Teevan et al. | |
| 2008/0005069 A1* | 1/2008 | Payne | G06F 16/9535 |
| 2014/0095495 A1* | 4/2014 | Brukman | G06F 16/248 |
| | | | 707/732 |

(Continued)

FOREIGN PATENT DOCUMENTS

CN 111782965 A 10/2020

OTHER PUBLICATIONS

Jiang He et al., A Flexible Content Adaptation System Using a Rule-Based Approach, Jan. 1, 2007, IEEE Computer Society, vol. 19, No. 1, pp. 127-140 (Year: 2007).*

(Continued)

*Primary Examiner* — Tam T Tran
(74) *Attorney, Agent, or Firm* — Haynes and Boone, LLP (57) ABSTRACT

Methods and systems are presented for dynamically modifying electronic content presented on a user device by third-party content providers based on goals associated with one or more entities. A content modification system may receive inputs related to goals for a user. The content modification system may synthesize the goals associated with the user. When the user uses a user device to request content from a third-party server, the content modification system may obtain the content and extract items included within the content. The content modification system may modify the content based on the synthesized goals, such as re-arranging the items, highlighting some of the items, or adding and/or removing items. The content modification system may cause the user device to present the modified content.

20 Claims, 5 Drawing Sheets

(56) References Cited

U.S. PATENT DOCUMENTS

| | | | | |
|---|---|---|---|---|
| 2015/0046446 A1* | 2/2015 | Gannu | ............... | G06F 16/9535 |
| | | | | 707/734 |
| 2016/0050446 A1* | 2/2016 | Fujioka | .............. | G06F 16/9535 |
| | | | | 725/93 |
| 2021/0173881 A1* | 6/2021 | Ciano | .................... | H04L 67/02 |

OTHER PUBLICATIONS

Harshada P. Bhambure et al., Click Based Inferring of User Search Goals using Pseudo Document, Sep. 1, 2015, IEEE International Conference on Computer—Communication—and Control, pp. 1-7 (Year: 2015).*

Paul Ferguson et al., Enhancing the Functionality of Interactive TV with Content-based Multimedia Analysis, Dec. 1, 2009, IEEE Computer Society, pp. 495-500 (Year: 2009).*

Franklin Reynolds, Smart Phones, Dec. 1, 2008, IEEE Xplore, pp. 6-8 (Year: 2008).*

* cited by examiner

GOAL-BASED DYNAMIC MODIFICATIONS TO USER INTERFACE CONTENT

BACKGROUND

The present specification generally relates to presentation of electronic content, and more specifically, to dynamically modifying displayable electronic content according to various embodiments of the disclosure.

RELATED ART

As abundant of information is becoming vastly available on the Internet, the ability to distill the information to only those that are relevant to a user becomes essential. In this regard, websites that provide content to users (e.g., news media website, online merchants that offer products/services for sale, etc.) usually provide search and/or filtering tools that enable a user to retrieve and/or filter the content on the websites. For example, an online merchant that offers products for sale may enable the user to search for relevant products based on a set of criteria such as a description, a price range, an attribute such as colors, sizes, and other criteria. In some cases, the online merchant may also enable the user to sort the filtered products based on one or more factors, such as relevance, price, user review, etc.

These search and filtering tools implemented on the content provider websites can be useful to the user when the criteria used by the websites for searching and/or filtering matches the criteria that are relevant to the user. However, when there is a mismatch of search and/or filtering criteria, the website may not be able to present content that is relevant to the user even with the search and filtering tools. For example, the user may be interested in fair-trade products and/or food products that are safe for a specific allergy condition. If the website's search/filtering tools do not include a fair-trade option and/or the specific allergy condition as search criteria, the content provided by the website may not be relevant to the user, even with the use of other search and filtering tools provided by the website. Furthermore, conventional search/filtering functions provided on websites likely require the user to provide specific attributes for the search (e.g., keywords, food ingredients of a food product, author/title of a book, etc.) and does not take into account the goals and/or objectives that the user tries to achieve. Thus, there is a need for providing a personalized search and filtering platform for dynamically modifying content for presentation to users.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for dynamically modifying electronic content presented on a user device by third-party content providers based on goals associated with a user of the user device. As discussed above, the search and filtering tools implemented on or by websites associated with the third-party content providers may be limited, as these websites can only perform the search and filtering functions based on a limited set of criteria and searching algorithms generated by the third-party content providers, and not the user. Thus, while the third-party content providers may attempt to generate the set of criteria to satisfy the general needs of users of the website, the criteria used for searching and filtering may not be personalized for each individual user. When the interest of a user does not align with the set of criteria used by the search tools of the third-party content providers, the websites may not provide content that is relevant to the user. For example, the user may be interested in viewing (or making a purchase of) only food items that have been involved in fair trade during the supply-chain process or food items that are safe for people having a specific allergy condition. If the website of a third-party content provider does not allow searching and/or filtering based on these criteria, the user would not be able to obtain relevant search results using the search/filtering tool of the website. Even if the website enables a search based on such criteria (e.g., allowing the user to input free form search descriptors, etc.), the search result may still not be desirable as the website may not present only items that satisfy the user's specific criteria (e.g., "fair trade" and/or "safe for allergy" in the above example), but include also results that do not satisfy that specific criteria. In other words, items that satisfy those user-defined criteria may be presented in the mix of other items that do not satisfy the user-defined criteria. As such, the user is still required to sift through each and every item before making a purchase.

In another example, the user may desire to purchase items that would help the user in making progress toward a goal. The goal can be a health-related goal (e.g., losing weight, healthy for hearts, gaining body mass, etc.), an academic or career goal (e.g., proficient in a certain technology area or programming language, etc.), a stylistic goal (e.g., décor for an event such as a baby shower having a particular theme), or other type of goal. However, not knowing how to translate the goals into specific item attributes and/or the progress of the user toward the goal, the search/filtering tool of the website may not be able to produce results that are relevant to the user.

To address these problems, according to various embodiments of the disclosure, a content modification system may modify content presented on a user device (e.g., a search result performed by a third-party content provider, etc.) based on goals associated with a user of the user device. In some embodiments, the content modification system may allow the user to provide one or more goals that the user would like to achieve. The goals can be, as non-limiting example, a personal goal (e.g., a health-related goal, a fitness-related goal, a financial goal, a social-awareness goal, etc.), a work-related goal (e.g., becoming a manager, becoming an expert in a technical area, etc.), or a project goal (e.g., organizing a baby shower, decorating the house for a festivity, etc.). The content modification system may store the one or more goals of the user in association with a user account of the user. Once the goals are associated with the user account, the content modification system may use the goals of the user to modify content that is presented on a user device associated with the user.

In this regard, the content modification system may detect that a user device of the user has obtained displayable data from a third-party website. The third-party website may be associated with a third-party content provider, which may be an entity that provides various content to users such as a news media, a library, a research institute, an online merchant, etc. The third-party website may provide a search/filtering tool that enables the user to search for content that is available within the third-party website (e.g., by providing a text input box that can receive one or more keywords from the user, by providing a selection tool that can receive selections of one or more predetermined options from the user, etc.). For example, if the third-party website is associated with a library or research institute, the user may search for academic papers and/or articles based on a set of search criteria (e.g., technical areas, keywords, a time (or a time range) when the papers/articles are published, names of authors, etc.). In another example where the third-party website is associated with an online merchant, the user may search for products (e.g., goods, services, etc.) available for sale by the online merchant based on a set of search criteria. For example, the user may browse the third-party website for a type of food (e.g., pasta, dumplings, etc.) or a type of book (e.g., books on Java® programming, books on cloud programming, books on management, etc.). The user may provide inputs associated with the set of search criteria through the third-party website.

Upon receiving the inputs from the user, the third-party website may access a third-party database that stores content associated with multiple items (e.g., all of the items that are offered for sale by the online merchant, all of the papers and articles stored within the library or research institute, etc.). The third-party website may then query the third-party database based on the set of search criteria to retrieve the set of items. The third-party website may generate the displayable content (e.g., a webpage) to include the set of items, and may transmit the displayable content to the user device.

In some embodiments, the content modification system may include a plug-in or an application that is linked to a content browsing application such as a web browser of the user device. Through the plug-in or application, the content modification system may detect that displayable content is being retrieved by the user device from a third-party website (e.g., based on the search criteria inputs provided by the user). The displayable content may include a set of items associated with the set of search criteria provided by the user. As discussed herein, the displayable content provided by the third-party content provider may include items that are not relevant or of interest to the user for the particular search. Furthermore, the relevant items that are presented on the user device may be intermingled with the irrelevant items, which makes it a challenge for the user to differentiate relevant items from irrelevant items in the displayable content.

In some embodiments, upon detecting that displayable content is obtained by the user device from the third-party website, the content modification system may determine a set of criteria based on the one or more goals of the user and the items included in the displayable content. For example, the content modification system may parse the displayable content (e.g., the HTML code of a webpage) to determine a category of the items included in the displayable content. The content modification system may then determine a set of criteria for filtering the items based on the one or more goals of the user and the category.

In some embodiments, the content modification system may first determine specific targets based on the one or more goals. For example, the user may specify, as part of a health goal, a daily maximum sodium intake, a daily maximum calories intake, etc. The user may also specify a set of health condition and/or dietary restrictions (e.g., need gluten-free diet, cannot ingest nuts, etc.). Thus, when the category of the items included in the displayable content includes food items, the content modification system may generate a set of criteria that includes a sodium threshold, a calories threshold, a gluten restriction, a nut restriction, etc.

In some embodiments, the content modification system may determine the set of criteria further based on a progress of the user toward the goal. For example, if the content modification system detects that the user has already ingested food with a certain amount of sodium and calories, the content modification system may adjust the set of criteria by changing the sodium and calories thresholds based on the user's progress toward the health goal.

In another example, the one or more goals may include a career goal of becoming proficient in cloud programming, and may specify specific targets, such as reaching a certain level of proficiency in Java programming for cloud computing and a certain level of proficiency in C++ programming for cloud computing. The content modification system may then generate a set of criteria that includes a combination of keywords such as a combination of "cloud" and "Java," and another combination of "cloud" and "C++." As such, the content modification system may select items, from the items in the displayable content, that include both of the keywords "cloud" and "Java," or both of the keywords "cloud" and "C++." Based on this set of criteria, items that are directed to cloud computing in Python would not satisfy the search criteria.

Similar to the example above, the content modification system may track a progress of the user (e.g., a buying history of the user) and may adjust the set of criteria based on the progress. For example, if the user has purchased multiple books on cloud programming in Java, the content modification system may determine that the user has made substantial progress towards being proficient in cloud programming using Java, but not much progress made towards being proficient in cloud programming using C++. Thus, the content modification system may adjust the set of criteria, for example, by eliminating the combination of keywords "cloud" and "Java" or assigning a larger weight for the combination "cloud" and "C++" than the weight for the combination "cloud" and "Java."

In some embodiments, the content modification system may integrate multiple goals to determine the set of criteria. The multiple goals may be provided by the same user, or from different users. Consider a scenario where the user works at an organization. The user may be associated with a team responsible for developing software products for the organization. The user may have a career goal to become proficient in computer programming in various programming languages, which may include Java, C++, Python, etc. The team, on the other hand, is tasked by the organization to develop a software product using Java. Thus, the team may set a goal for every team member to become proficient in Java. The organization that the user works for may decide to change the direction of their products to cloud-based products. Thus, the organization may set a goal for every employee to become proficient in cloud programming. In this example, three different sets of goals—a personal career goal of the user, a team goal, and an organization goal—may all be associated with the user.

When the content modification system detects that a displayable content is retrieved by the user device of the user from a third-party website, the content modification system may determine a set of criteria based on the multiple goals. To determine the set of content, the content modification system may first synthesize the goals. In some embodiments, the content modification system may assign weights to different goals. The weights assigned to the goals may be determined based on the origin of the goals. For example, using the example discussed above where the user works at an organization, the goal(s) from the organization may have the highest weight, the goal(s) from the team may have a less weight than the goal(s) from the organization, and the goal(s) directly from the user may have the least weight. Thus, if the goals from the different origins are conflicting, the goals with a higher weight would trump the goals with a lower weight.

In addition, the content modification system may assign weights to the keywords (or keyword combinations) based on the number of goals (and which goals) that keywords (or keyword combinations) are associated. For example, the keyword combination "cloud" and "programming" may go towards both the organization goal of becoming proficient in cloud computer technology and also the user's personal goal of becoming proficient in programming languages. Thus, such a keyword combination may be assigned a higher weight than another keyword that is only associated with one of the goals.

In some embodiments, upon determining the set of criteria, the content modification system may use the set of criteria to modify the displayable content. The content modification system may obtain a list of items included in the displayable content by parsing the displayable content (e.g., the HTML code of the webpage). The content modification may determine items that satisfy the set of criteria and items that do not satisfy the set of criteria. The content modification system may modify the displayable content by highlighting those items within the displayable content (e.g., inserting a marker such as a star next to each of the items that satisfy the set of criteria, etc.).

In some embodiments, the content modification system may rank the items included in the displayable content based on the set of criteria determined for the user. For example, the items that satisfy more criteria within the set of criteria may be ranked higher than items that satisfy less criteria within the set of criteria. The content modification system may then modify the displayable content by re-arranging the items included within the displayable content based on the ranking, such that the items that rank higher may appear higher in the displayable content than items that rank lower.

In some embodiments, the content modification system may retrieve additional items to be added to the displayable content. For example, the third-party website may obtain, based on the search criteria obtained from the interaction with the user, a set of items as the search result. The third-party website may be configured to display a limited number of items (e.g., 20, 40, etc.) at a time, and the user may view additional items by browsing to another webpage of the third-party website. For example, the displayable content obtained by the user device from the third-party provider may only include a subset of the set of items. The content modification system may detect that additional items may be obtained from another webpage of the third-party website (e.g., a next webpage) by selecting a button (e.g., a link) corresponding to the next webpage based on parsing the displayable content. The content modification system may use the link to obtain the next webpage (e.g., use the plug-in to transmit an HTTP request based on the link), and may extract the additional items from the next webpage. In some embodiments, the content modification system may continue to traverse the webpages to extract all of the items from the search result of the third-party website. The content modification system may rank all of the items based on the set of criteria and may re-arrange the items in the displayable content based on the ranking. Since some of the high-ranking items may be items not from the first webpage (e.g., the displayable content), but from subsequent webpages, of the third-party website, the content modification system may add items from the subsequent webpages to the displayable content (and may remove some of the lower-ranking items from the displayable content) before presenting the displayable content on the user device.

In some embodiments, for the items that are considered relevant to the user based on the set of criteria, the content modification system may determine an order for advancing toward the goal(s) of the user. For example, when the user's goal is becoming proficient in Java, the content modification system may select items (e.g., books, training materials, etc.) on Java programming for the user. However, those items on Java programming may not have the same relevancy to the user as they may target viewers at different proficiency levels in Java programming. Thus, the content modification system may first determine a progress of the user toward the goal (e.g., how proficient the user is at Java programming), for example, based on a content access history (e.g., which item has the user accessed/purchased in the past). The content modification system may filter out items that are no longer relevant to the user based on the user's progress (e.g., items that target viewers at a lower proficiency level than the user). In addition, the content modification system may determine a path for advancing toward the goal based on the items that are considered relevant to the user. For example, the content modification system may determine an order for the items that the user should access to achieve the goal. In this example, the order of the items may be a progression of proficiency in Java programming. The content modification system may modify the displayable content to indicate the order of the items (e.g., by placing a number corresponding to the order next to the item, etc.). This way, not only would the user know which item is most relevant to the user based on the user's current progress toward the goal, the user would also know what items the user should access in the future based on the goal.

Figure 1:
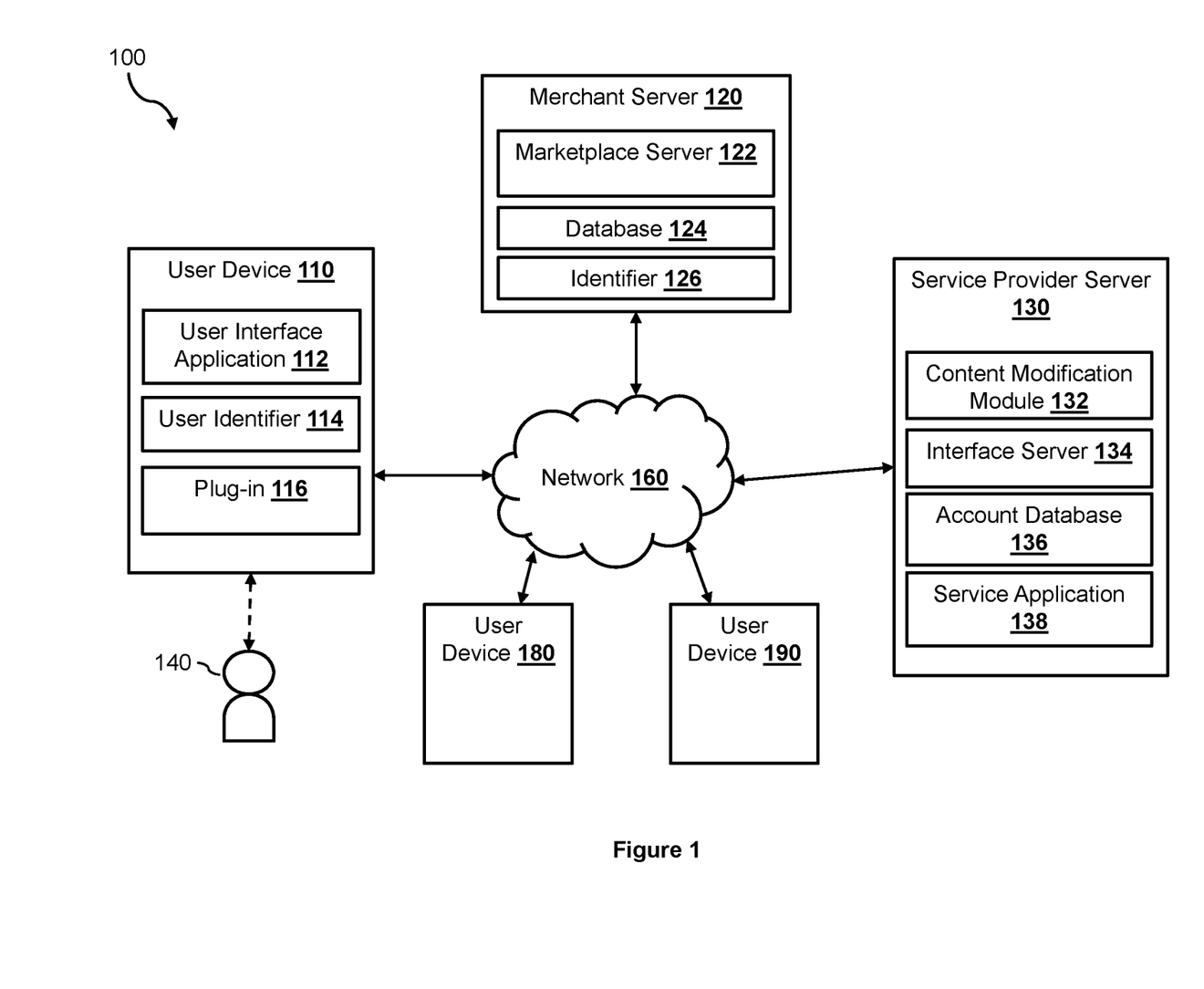
FIG. 1 is a block diagram illustrating a networked system that includes an electronic transaction system according to an embodiment of the present disclosure.

FIG. 1 illustrates a networked system 100, within which the content modification system may be implemented according to one embodiment of the disclosure. Note that the present techniques may be applied in many different computing and technological environments, however, and are not limited to those shown in the figures. The networked system 100 includes a service provider server 130, a merchant server 120, and user devices 110, 180, and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online transaction with the merchant server 120 via websites hosted by, or mobile applications associated with, the merchant server 120. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the UI application 112 includes a software program (e.g., a mobile application) that provides a graphical user interface (GUI) for the user 140 to interface and communicate with the service provider server 130, and/or the merchant server 120 via the network 160. In another implementation, the UI application 112 includes a browser module that provides a network interface to browse information available over the network 160. For example, the UI application 112 may be implemented, in part, as a web browser to view information available over the network 160.

The user device 110, in various embodiments, may include a plug-in application 116 associated with the content modification system. The plug-in application 116 may be integrated with the UI application 112 to provide the UI application 112 additional functionalities associated with the content modification system. For example, the plug-in application 116 may monitor activities of the UI application 112 (e.g., content request such as HTTP request transmitted by the UI application 112 to a third-party server such as the merchant server 120, displayable content received by the UI application 112 from a third-party server such as the merchant server 120, etc.). Thus, the plug-in application 116 may detect that displayable content that includes a set of items is obtained by the UI application 112 from a third-party server (e.g., the merchant server 120). In response to detecting that the displayable content is obtained by the UI application 112, the plug-in application 116 may modify the content in the displayable content using the techniques disclosed herein and cause the UI application 112 to present the modified displayable content on the user device 110.

The user device 110, in one embodiment, may include at least one user identifier 114, which may be implemented, for example, as operating system registry entries, cookies associated with the UI application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account (e.g., and a particular profile) maintained by the service provider server 130.

In various implementations, the user 140 is able to input data and information into an input component (e.g., a keyboard) of the user device 110. For example, the user 140 may use the input component to interact with the UI application 112 (e.g., to retrieve content from third-party servers such as the merchant server 120, to provide inputs related to a goal to the service provider server 130, etc.).

Each of the user devices 180 and 190 may be associated with the same user 140 or different users and may include similar components as the user device 110 to perform the functions described herein. While only three user devices 110, 180, and 190 are shown in FIG. 1, it has been contemplated that more than three user devices, each associated with a different user, may be connected to the merchant server 120, the service provider server 130, via the network 160.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for viewing, accessing, and/or purchasing, and process payments for the purchases. As shown, the merchant server 120 may include a merchant database 124 for identifying available items, which may be made available to the user devices 110, 180, and 190 for viewing and purchase by the user.

The merchant server 120, in one embodiment, may include a marketplace application or server 122, which may be configured to provide information (e.g., displayable content) over the network 160 to the UI application 112 of the user devices 110, 180, and 190. In one embodiment, the marketplace application 122 may include a web server that hosts a merchant website for the merchant. For example, the user 140 of the user device 110 may interact with the marketplace application 122 through the UI application 112 over the network 160 to search and view various items available for access and/or purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user devices 110, 180, and 190 and the service provider server 130 via the network 160.

The service provider server 130, in one embodiment, may be maintained by a transaction processing entity or an online service provider, which may provide processing for electronic transactions between the users of the user devices 110, 180, and 190, and one or more merchants or other types of payees. As such, the service provider server 130 may include a service application 138, which may be adapted to interact with the user devices 110, 180, and 190, and/or the merchant server 120 over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140 or a merchant associated with the merchant server 120, etc.) may access a user account associated with the user and access various services offered by the service provider server 130, by generating HTTP requests directed at the service provider server 130. In some embodiments, the fragment module integration framework may be implemented within or in association with the interface server 134.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a content modification module 132 that implements at least part of the content modification system as discussed herein. The content modification module 132 may communicate with the user devices 110, 180, and 190, and the plug-in application 116 executed on the user devices to provide the content modification functionalities disclosed herein. For example, the user 140 may register a user account with the service provider server through an interface provided by the service provider server 130. Once a user account is created, the content modification module 132 may enable the user 140 to provide inputs corresponding to one or more goals. The content modification module 132 may associate the one or more goals with the user account. In some embodiments, the content modification module 132 may also enable other users (e.g., users of user devices 180, 190, etc.) to provide inputs corresponding to one or more goals for the user 140. As such, the content modification module 132 may associate goals provided by the user 140, and also goals provided by other users (or entities) with the user account of the user 140.

When the plug-in application 116 detects that displayable content is obtained by the UI application 112 of the user device 110 from a third-party server, the plug-in application 116 and/or the content modification module 132 may determine a set of criteria based on the goals associated with the user account and a category of the items included in the displayable content. The plug-in application 116 and/or the content modification module 132 may modify the displayable content based on the set of criteria and may cause the UI application 112 to present the modified displayable content to the user 140.

Figure 2:
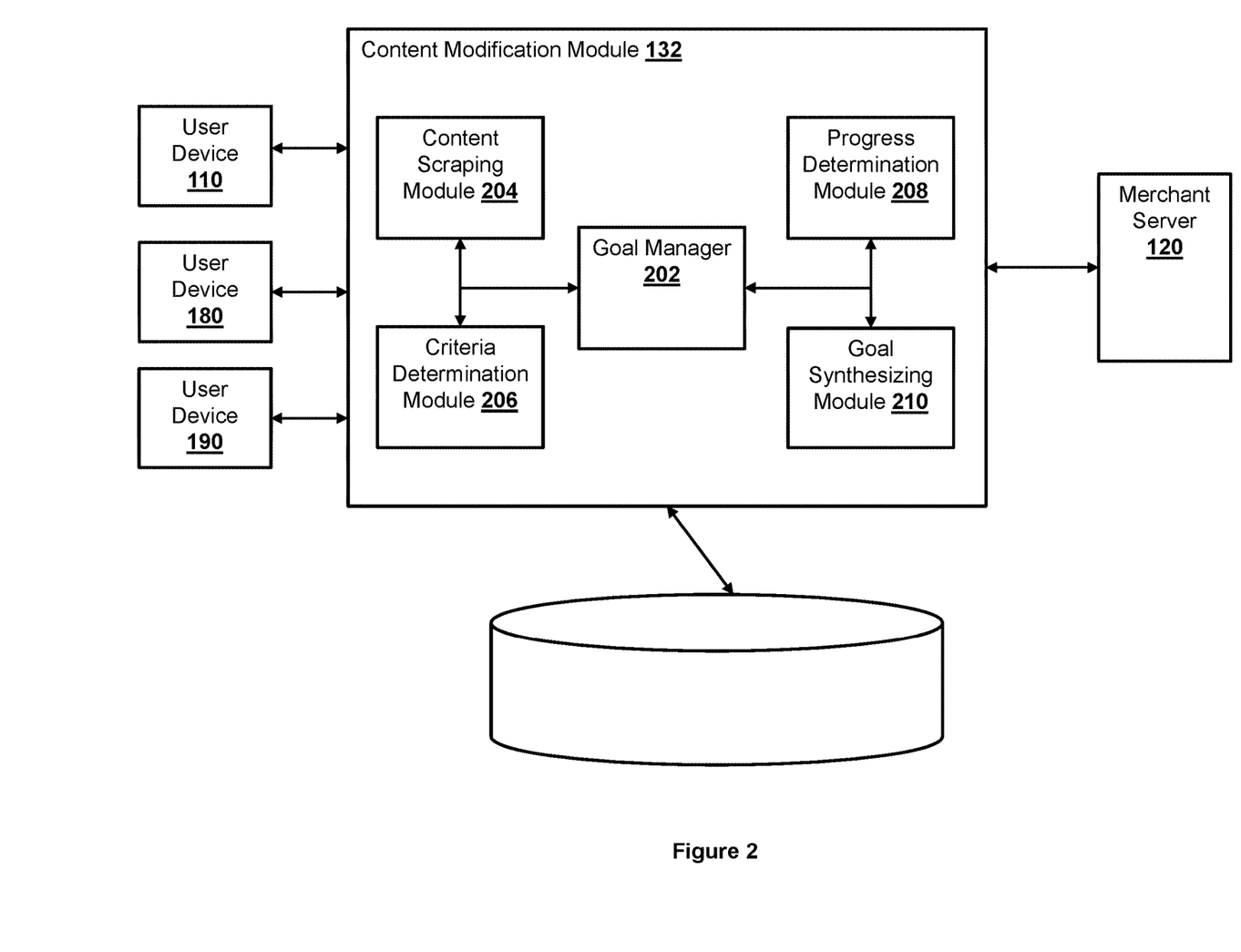
FIG. 2 is a block diagram illustrating a content modification module according to an embodiment of the present disclosure.

FIG. 2 illustrates a block diagram of the content modification module 132 according to an embodiment of the disclosure. The content modification module 132 includes a goal manager 202, a content scraping module 204, a criteria determination module 206, a progress determination module 208, and a goal synthesizing module 210. The goal manager 202 may provide, through the interface server 134, a user interface that enables a user (e.g., the user 140) to provide inputs corresponding to one or more goals. For example, the goal manager 202 may provide different goal options for the user 140 to select, such as a healthy-diet goal (e.g., a low sugar diet, a low calories diet, etc.), a social goal (e.g., support fair-trade products, support green products, etc.), an exercise goal, an academic goal (e.g., advance in a certain field such as programming, medicine, etc.), a career goal (e.g., to be in a certain position within an organization, etc.), or other types of goals. Once the user 140 has selected a particular goal, the goal manager 202 may enable the user, through the user interface, to provide specific targets for the goal. The target may include measurable metrics associated with the goal (e.g., a maximum calories input per day, a certain proficiency level in an academic field such as a programming language or a particular technical area, etc.).

As discussed herein, multiple users may be enabled to provide goals in association with a single user account. For example, the user 140 may specify to the content modification module 132 which other users are allowed to add goals for the user 140. Different users (e.g., users of the user devices 180 and 190) may be allowed to add different types of goals for the user 140. For example, people from the organization that the user 140 works at may be allowed to add career goals or academic goals for the user account, while a family member of the user 140 may be allowed to add health goals to the user account.

Based on inputs from different users for the same user account, multiple goals (possibly from the same or different users) that correspond to the same goal type (e.g., a career goal type, a health goal type, etc.) may be associated with that same user account. For example, the user 140 may be a software engineer working at a software company. The user 140 may provide inputs to the content modification module 132 indicating a personal self-improvement goal of being proficient in general computer programming. Specifically, the user 140 may provide specific targets of being at a certain proficiency level for various programming languages such as C++, Python, and Java. The team that the user 140 belongs in at the software company may be developing software products using a particular programming language (e.g., Java). Thus, the team may provide inputs to the content modification module 132 indicating a self-improvement goal of being proficient in Java programming for user accounts associated with the team members (including the user 140). On the other hand, the software company may be changing the direction of its products by moving many of its software products to cloud-based software products. Thus, the software company may provide inputs to the content modification module 132 indicating a self-improvement goal of becoming proficient in cloud computing for user accounts associated with the software company (including the user 140).

Since there might be multiple goals or targets toward the same goal type, the goal synthesizing module 210 may synthesize the goals for the user 140. In some embodiments, the goal synthesizing module 210 may determine a hierarchy of goals for the user 140 based on the origins of the goals. Using the example above, the goal synthesizing module 210 may determine that the goal(s) from the organization (e.g., the software company) is higher in a hierarchy than the goal(s) from the team. The goal synthesizing module 210 may also determine that the goal(s) from the team is higher in the hierarchy than the goal(s) from the user 140. The hierarchical structure of goals may then be used by the criteria determination module 206 to filter and/or rank the items in a displayable content for the user 140. In another example, health goals provided by a doctor may be higher in rank or hierarchy than heal goals from the user 140 or from a relative of the user 140. Thus, hierarchy of goals/targets provided by different users for the same user 140 may be based on the type of goal.

In some embodiments, the progress determination module 208 may determine a progress of the user 140 toward each of the goals associated with the user account. For example, when the goals are related to knowledge (e.g., programming proficiency, etc.), the progress determination module 208 may determine the progress for the goals based on different factors, such as an education, certificate(s) obtained by the user 140, and past access of educational content such as past purchases of books, past viewing of articles, etc. When the goals are health-related, the progress determination module 208 may determine the progress for the goals based on biometrics information such as blood pressure, cholesterol levels, etc. and past food intake (e.g., an amount of calories already taken within the day, an amount of sodium already taken within the day, etc.).

In some embodiments, the goal manager 202 may also enable, through the user interface, the user 140 to download the plug-in application 116 associated with the content modification system to the user device 110, if the plug-in application 116 is not already installed on the user device 110. The plug-in application 116, once installed on the user device 110, may work with the content modification module 132 to provide the content modification functionalities as described herein. For example, since the plug-in application 116 is connected with the UI application 112, the plug-in application 116 may monitor activities of the UI application 112. In some embodiments, the plug-in application 116 may operate in an inactive state where the plug-in application 116 may passively listen to (e.g., monitor) various activities of UI application 112, which may include interactions between the UI application 112 and the user 140, and interactions between the UI application 112 and third-party servers (e.g., the merchant server 120).

While monitoring the activities, the plug-in application 116 may detect a request for displayable content transmitted from the UI application 112 to a third-party server (e.g., the merchant server 120). The request may involve requesting one or more items based on a first set of criteria. The first set of criteria may be provided by the user 140 through an interface (e.g., a webpage) associated with the third-party server. For example, the user 140 may use the UI application 112 to browse a website of the third-party server (e.g., a merchant website). The user 140 may submit a request, through the website, to view items offered by the merchant website. In one particular example, the merchant website may be associated with an online book store, and the merchant website may provide a search and filter tool that enables the user to submit a request to view various books based on a first set of categories. The search and filter tool may be in the form of a text input box where the user 140 may provide keywords (e.g., "programming," "Java," "C++," etc.). The search and filter tool may also include additional filtering function based on criteria determined by the merchant website, such as a price range, a review score threshold, etc. The third-party server may generate displayable content that includes items based on the first set of criteria provided by the user 140 and may transmit the displayable content to the UI application 112 of the user device 110.

Upon detecting the request, the plug-in application 116 may change from operating in an inactive state to operating in an active state. Specifically, when the UI application 112 receives the displayable content from the third-party server, the plug-in application 116 may access the displayable content. The plug-in application 116 and/or the content modification module 132 may modify the displayable content based on a second set of criteria that is determined based on the one or more goals associated with the user account of the user 140. The second set of criteria is different from the first set of criteria used by the third-party server to generate the displayable content. Since the second set of criteria is not limited to the search category used by the third-party server, but instead based on the goals associated with the user account, the second set of criteria is more personal and relevant to the user 140. The plug-in application 116 may then cause the UI application 112 to present the modified displayable content on the user device 110.

For example, the plug-in application 116 may transmit the displayable content to the content modification module 132. Once the displayable content is obtained, the content scraping module 204 may parse the displayable content to determine a set of items included in the displayable content. In some embodiments, the content scraping module 204 may determine an item category of the set of items included in the displayable content. Using the example described above where the website is an online merchant that sells books, and the user 140 used the search tool of the website to search for books related to "programming," "Java," and "C++," the displayable content may include various books related to programming in general, related to Java programming language, and related to C++ programming language. However, some of the items included in the displayable content may not be relevant to the user 140 based on the goals associated with the user account of the user 140 and the progress of the user 140 toward those goals. For example, some of the items included in the displayable content, while related to "programming," "Java," and "C++" in general, may be too simple or too advanced for the user 140 based on the progress (or current proficiency level) of the user 140. Furthermore, the inclusion (and the order) of the items in the displayable content may not have taken into account goals provided by others for the user account, such as goals from the team of the user 140 and goals from the organization of the user 140.

In some embodiments, the criteria determination module 206 may determine the second set of criteria for modifying the displayable content based on the goal(s) associated with the user account and the progress of the user 140 toward the goal(s). The criteria determination module 206 may access the goal(s) associated with the user account. For example, the user account of the user 140 may be associated with a goal of "becoming more proficient in programming" provided by the user 140, a goal of "becoming more proficient in Java" provided by the team of the user 140, and a goal of "becoming more proficient in cloud computing" provided by the organization of the user 140.

In some embodiments, the criteria determination module 206 may determine a set of keywords based on the goal(s) associated with the user account. For example, the criteria determination module 206 may generate keywords that are relevant to the goal(s) associated with the user account. The goal synthesizing module 210 may determine priorities associated with the goals based on different factors, such as the origin of the goals. As discussed herein, the criteria determination module 206 may prioritize the goals. In some embodiments, the priority of the goals may be determined based on the origin of the goals and/or user inputs obtained from the user 140. In the example described herein, the goal(s) provided by the organization of the user 140 may have a higher priority than the goal(s) provided by the team of the user 140, which in turn may have a higher priority than the goal(s) provided by the user 140. Even among the goals provided by the same entity, that entity may specify which goals have higher priority than the other goal(s). The criteria determination module 206 may the assign weights to the keywords based on which goal(s) the keywords are related. For example, a higher weight may be assigned to a keyword that is related to a goal with a higher priority than a keyword that is related to a goal with a lower priority. Furthermore, the criteria determination module 206 may increase the weight assigned to a keyword when the keyword is related to multiple goals (e.g., combining the weights associated with the goals). The goal manager 202 may then filter the items included in the displayable content based on the keywords generated by the criteria determination module 206. The goal manager 202 may further compute a score for each item included in the displayable content based on the keyword(s) and rank the items based on the score.

Figure 3:
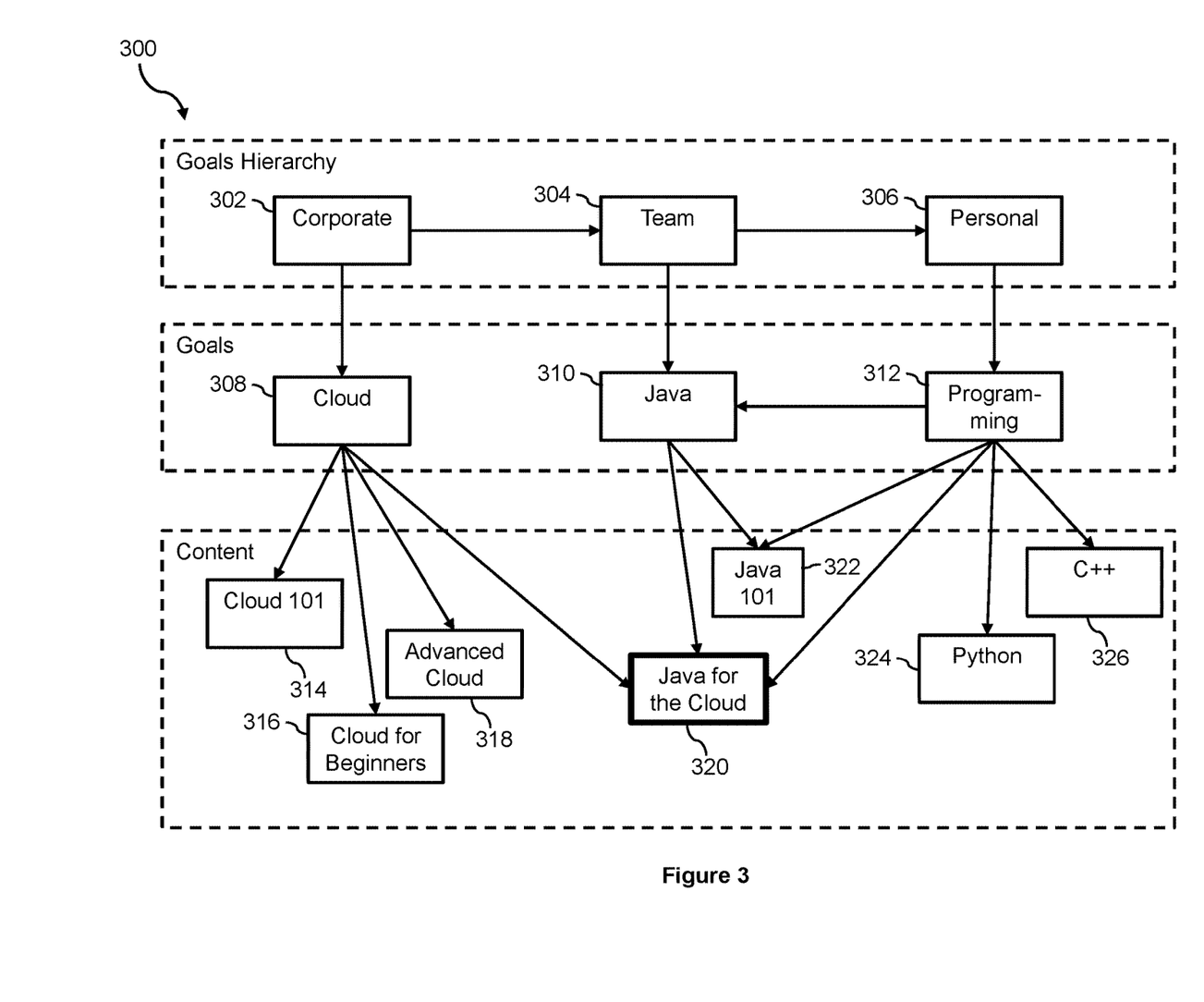
FIG. 3 illustrates a networked graph showing connections between items in a displayable content and goals according to an embodiment of the present disclosure.

In some embodiments, instead of a keyword approach, the criteria determination module 206 may generate a graph that connects the items included in the displayable content based on the hierarchy of the goals associated with the user account of the user 140. The criteria determination module 206 may first access the hierarchy of the goals associated with the user account and may generate the initial nodes of the graph based on the hierarch of the goals. FIG. 3 illustrates an example graph 300 that is built based on three different goals, a corporate goal, a team goal, and a personal goal for the user account. As shown, the graph 300 includes a first layer of nodes for the different entities that provided goals for the user account. The first layer of nodes includes a node 302 representing a corporation that the user 140 works for, a node 304 representing a team that the user 140 belongs to within the corporation, and a node 306 representing the user 140. The directional connection between the nodes 302, 304, and 306 indicate the hierarchy of the entities. In this example, the directional connection from the node 302 to the node 304 indicates that the corporation is higher in the hierarchy than the team, and the directional connection from the node 304 to the node 306 indicates that the team is higher in the hierarchy than the user 140.

The criteria determination module 206 may also generate a second layer of nodes representing the goals provided by the entities. For example, the second layer of nodes includes a node 308 representing the goal provided by the corporation (e.g., "cloud computing"), a node 310 representing the goal provided by the team (e.g., "Java programming"), and a node 312 provided by the user 140 (e.g., "programming in general"). In some embodiments, the criteria determination module 206 may also determine connection(s) between the related goals. In this example, the criteria determination module 206 may determine that Java programming is a subset of programming in general, and thus generate a direction connection from the node 312 to the node 310.

The criteria determination module 206 may then generate a third layer of nodes representing the items included in the displayable content (and/or additional items from the website). In some embodiments, the criteria determination module 206 may generate a node for each item from the website. As shown, the criteria determination module 206 may generate a node 314 representing a book titled "Cloud 101," a node 316 representing a book titled "Cloud for beginners," a node 318 representing a book titled "Advanced Cloud," a node 320 representing a book titled "Java for the Cloud," a node 322 representing a book titled "Java 101," a node 324 representing a book titled "Python," and a node 326 representing a book titled "C++." The criteria determination module 206 may also incorporate attributes of the item (e.g., descriptions, book title, author, publication date, etc.) into the corresponding node. The criteria determination module 206 may then connect each node representing an item to one or more goals that are related to the item. For example, the criteria determination module 206 may analyze each node (e.g., the attributes of the item) and determine whether the item would help the user 140 in advancing toward any one of the goals. The criteria determination module 206 may determine whether the item would help the user 140 in advancing a goal based on whether the attributes of the item are relevant to the goal (e.g., whether the portion of the attributes related to the goal exceeds a threshold portion) and based on a progress of the user 140 toward the goal. For example, based on the book title and description of the items represented by nodes 314-318, the criteria determination module 206 may determine that the three books represented by the nodes 314-318 are related to cloud computing. However, if the criteria determination module 206 determines that the user 140 had no prior experience with cloud computing, the criteria determination module 206 may determine that the nodes 314 and 316 are more relevant in advancing toward the goal for being proficient in cloud computing for the user 140 than the node 318. In some embodiments, the relevancy of the item toward a goal may be indicated by a weight of the connection (e.g., thickness of the connection), such that a thicker connection between an item and a goal indicates a stronger relevancy and a thinner connection between an item and a goal indicates a weaker relevancy.

The criteria determination module 206 may continue to connect the nodes representing the items and the goals until all of the nodes representing the items have been analyzed. The goal manager 202 may then rank the items based on the connections between the items and the goal(s). For example, the goal manager 202 may determine a combined weight for an item by adding the weights of each connection between the item and a goal and may rank the nodes based on the combined weights. In this example, the item titled "Java for the Cloud" represented by the node 320 may have the highest ranking since the item is connected to all three goals represented by the nodes 308-312.

Once the items have been analyzed, filtered, and ranked, the goal manager 202 may modify the displayable content obtained from the third-party server. In some embodiments, the goal manager 202 may filter the items in the displayable content based on the relevancy toward achieving the goals of the user account. For example, the goal manager 202 may filter the items based on the ranking (e.g., filter out items below a predetermined ranking). The goal manager 202 may then modify the displayable content by highlighting those items within the displayable content (e.g., inserting a marker such as a star next to each of the items that are not filtered out, etc.). In some embodiments, the goal manager 202 may re-arrange the items included in the displayable content based on their ranking. Thus, the goal manager 202 arrange the items that rank higher to appear higher (e.g., at the top) than items that rank lower in the displayable content.

In some embodiments, the goal manager 202 may retrieve additional items to be added to the displayable content. For example, the third-party website may obtain, based on the first set of criteria, a set of items as the search result. The third-party website may be configured to display a limited number of items (e.g., 20, 40, etc.) at a time, which can be based on the type of user device or screen size, and the user 140 may view additional items by browsing to another webpage of the third-party website. For example, the displayable content obtained by the user device 110 from the third-party server may only include a subset of the set of items. The goal manager 202 may detect that additional items may be obtained from another webpage of the third-party website (e.g., a next webpage) by selecting a button (e.g., a link) corresponding to the next webpage based on parsing the displayable content. The goal manager 202 may use the link to obtain the next webpage. The content scraping module 204 may extract the additional items from the next webpage and provide the additional items to the goal manager 220. In some embodiments, the goal manager 202 and the content scraping module 204 may continue to traverse the webpages to extract all of the items from the search result of the third-party website. The goal manager 202 and/or the criteria determination module 206 may rank all of the items based on the second set of criteria and may re-arrange the items in the displayable content based on the ranking. Since some of the high-ranking items may be items not from the first webpage (e.g., the displayable content), but from subsequent webpages, of the third-party website, the goal manager 202 may add items from the subsequent webpages to the displayable content (and may remove some of the low-ranking items from the displayable content) before presenting the displayable content on the user device 110.

In some embodiments, in addition to highlighting and/or ranking the items, the goal manager 202 may indicate a path toward advancing toward a particular goal for the user 140. For example, when the goal is becoming proficient in cloud computing, the goal manager 202 may select items (e.g., books, training materials, etc.) related to cloud computing, such as the books represented by the nodes 314-318. However, those items on Java programming may not have the same relevancy to the user as they may target viewers at different proficiency levels in cloud computing. Thus, the goal manager 202 may determine an order of these items based on the progress of the user 140 toward the goal (as determined by the progress determination module 208), and attributes of the items. For example, the goal manager 202 may determine, based on the attributes of the items, that order of advancements for the items are first, the book titled "Cloud for Beginners" represented by the node 316, then the book titled "Cloud 101" represented by the node 314, and then the book titled "Advanced Cloud" represented by the node 318. Thus, while the items represented by the nodes 314, 316, and 318 all have the same relevancy for the user 140 (all of these items are associated with the corporate goal of becoming proficient in cloud computing), the goal manager may order the items in the order of advancement, such that the user 140 would understand which item the user 140 should obtain first, and other related items that the user 140 should obtain in the future.

The goal manager 202 may transmit the modified displayable content to the plug-in application 116, and the plug-in application 116 may cause the UI application 112 to present the modified displayable content on the user interface of the user device 110. In some embodiments, after obtaining the displayable content, the plug-in application 116 may withhold the displayable content from the UI application 112 such that the UI application does not present the displayable content until the displayable content has been modified by the content modification module 132. In some embodiments, the UI application 112 may present the original displayable content, and the plug-in application 116 may cause the UI application 112 to subsequently replace the displayable content with the modified displayable content.

Figure 4:
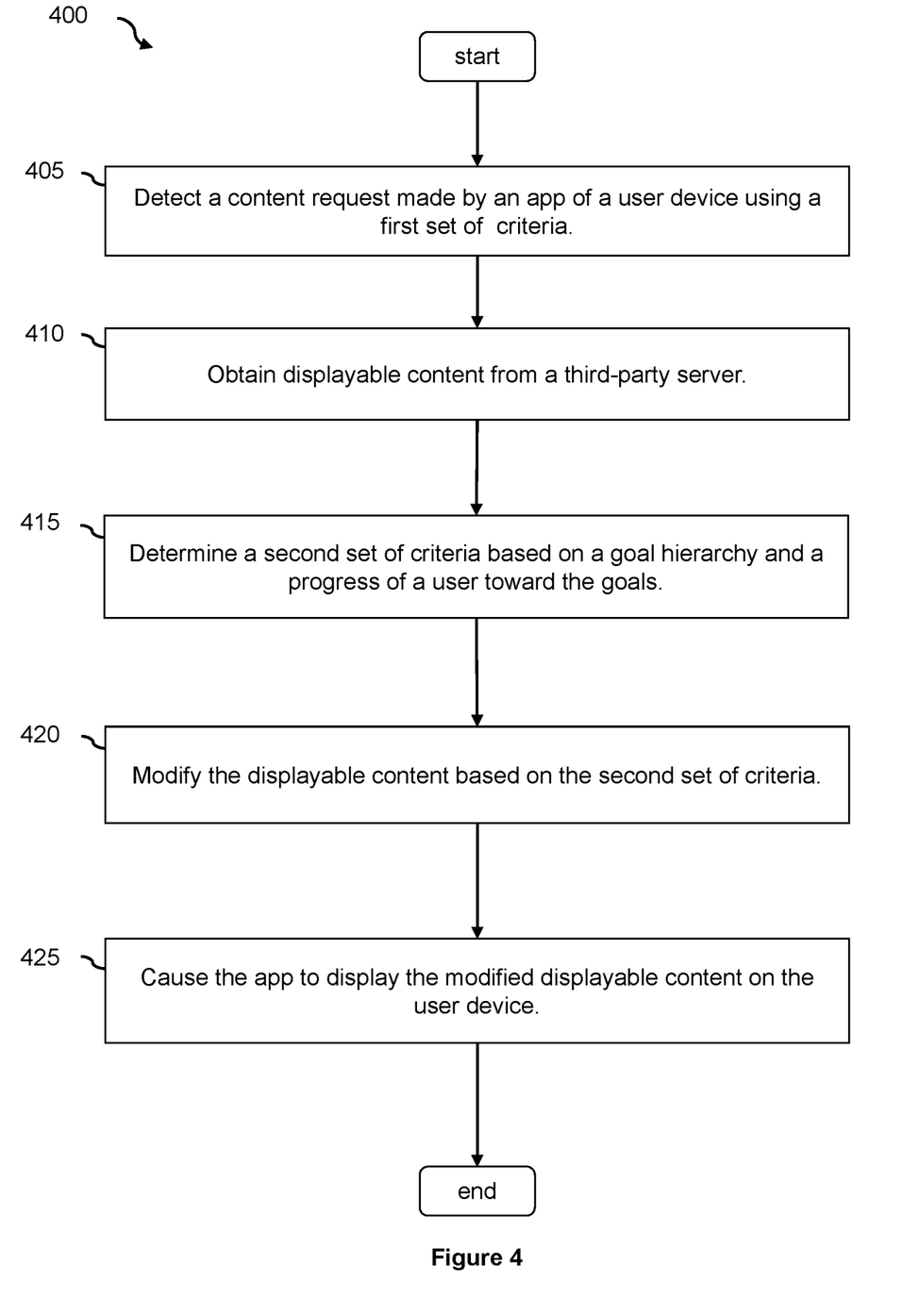
FIG. 4 is a flowchart showing a process of dynamically modifying displayable electronic content according to an embodiment of the present disclosure.

FIG. 4 illustrates a process 400 for dynamically modifying third-party content according to various embodiments of the disclosure. In some embodiments, at least a portion of the process 400 may be performed by the plug-in application 116 and/or the content modification module 132. The process 400 may begin by detecting (at step 405) a content request made by an application (or app) of a user device using a first set of criteria. For example, the user 140 may use the UI application 112 of the user device 110 to search for items (e.g., food products, books, etc.) on a third-party website (e.g., a merchant website associated with the merchant server 120). The first set of criteria may be determined based on interactions between the user 140 and the third-party website. The UI application may transmit a request (e.g., HTTP request) which includes the first set of criteria to the merchant server 120. The plug-in application 116 may continuously monitor the activities of the UI application 112 and may detect that a request with the first set of criteria is being transmitted to the merchant server 120. The merchant server 120 may query a database (e.g., the database 124) based on the first set of criteria and may generate displayable content (e.g., a webpage) that includes items retrieved from the database 124 based on the first set of criteria. The merchant server 120 may transmit the displayable content to the user device 110 in response to the content request.

The process 400 then obtains (at step 410) displayable content from a third-party server. For example, after detecting the content request, the plug-in application 116 may monitor content that is received at the user device 110 and may obtain the displayable content from the merchant server 120. The process 400 determines (at step 415) a second set of criteria based on a goal hierarchy and a progress of a user toward the goals. For example, the goal synthesizing module 210 may synthesize different goals associated with the user account of the user 140. The different goals may be provided by different entities, such as the user 140, a team to which the user 140 belong, an organization where the user 140 works, a family member of the user 140, etc. The goal synthesizing module 210 may prioritize the goals based on the origin of the goals. For example, the goal synthesizing module 210 may prioritize the corporate goal(s) from the corporation over the team goal(s) from the team and may prioritize the team goal(s) from the team over the personal goal(s) from the user 140. The goal synthesizing module 210 may also generate a hierarchy of goals based on the prioritization.

In some embodiments, the criteria determination module 206 may determine weights associate with each goal. The criteria determination module 206 may also determine keywords associated with the goals and may assign weights to the keywords based on which goal the keywords are related. For example, when a keyword is related to a first goal, the criteria determination module 206 may assign the weight associated with the first goal to the keyword. If the keyword is also related to a second goal, the criteria determination module 206 may add the weight associated with the second goal to the weight of the keyword.

In some embodiments, the criteria determination module 206 may generate a connected graph (e.g., the graph 300 in FIG. 3) that links goals to items included in the displayable content using techniques discussed herein. The graph 300 may indicate a connectedness between each item to one or more goals. Using the keywords or the graph, the goal manager 202 may rank the items in the displayable content based on the second set of criteria. In some embodiments, the goal manager 202 may retrieve additional items (e.g., other items that the merchant server 120 has retrieved from the database 124 but are not included in the displayable content) from the third party server and may rank the items in the displayable content and also the additional items together.

The process 400 then modifies (at step 420) the displayable content based on the second set of criteria and causes (at step 425) the app to display the modified displayable content on the user device. For example, the goal manager 202 may modify the items in the displayable content (e.g., re-arranging the order, removing some items, adding additional items, etc.) based on the ranking of the items. The goal manager 202 may transmit the modified displayable content to the plug-in application 116. Upon receiving the modified displayable content, the plug-in application 116 may cause the UI application 112 to present the modified displayable content (e.g., through an application programming interface of the UI application 112).

In the description above, the plug-in application 116 is described as separate from the modules within the content modification module 132. However, in some embodiments, one or more modules (e.g., the goal manager 202, the content scraping module 204, the criteria determination module 206, the progress determination module 208, and the goal synthesizing module 210) may be incorporated into the plug-in application 116 such that some of the functionalities of the content modification system may be performed locally in the user device 110.

Figure 5:
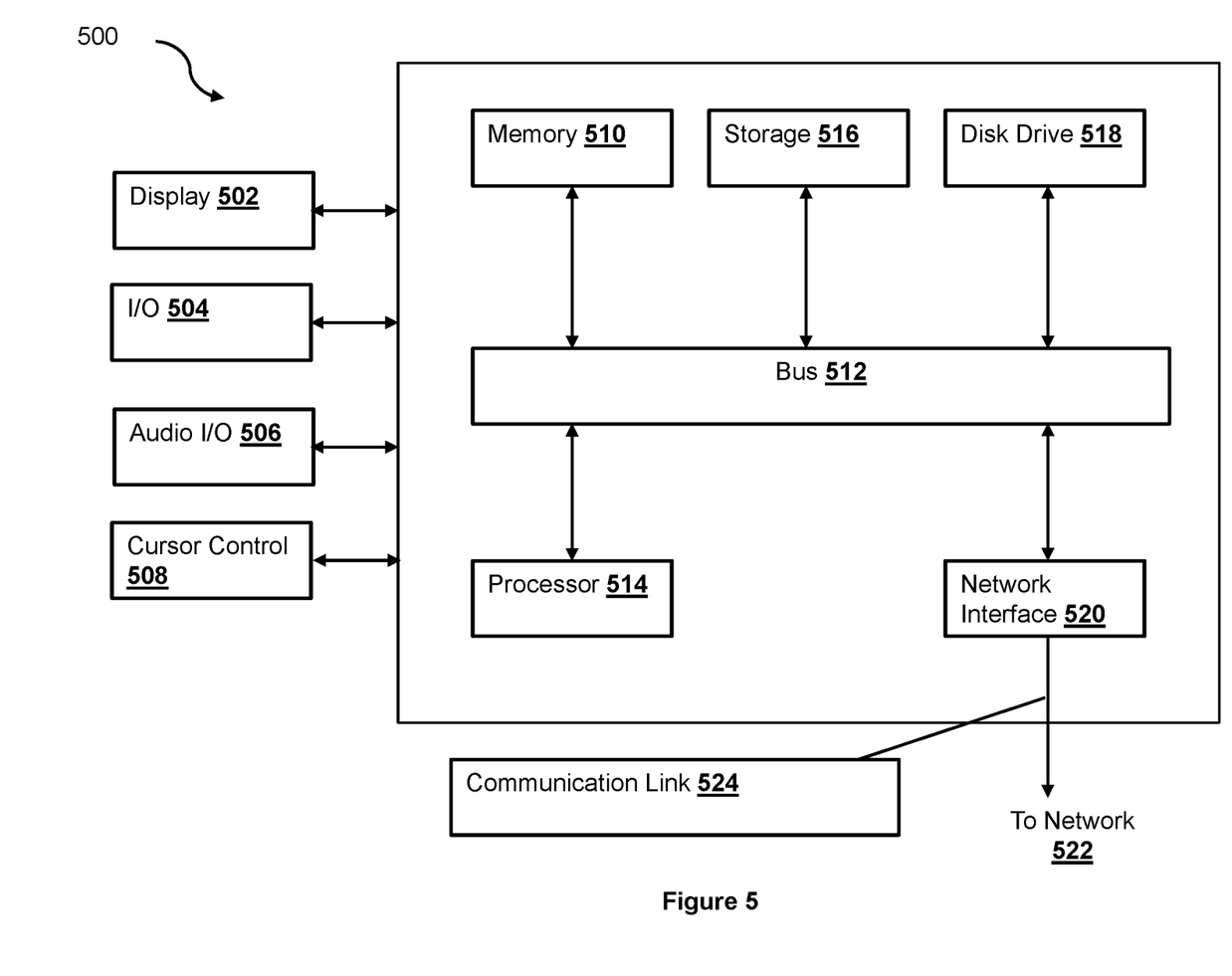
FIG. 5 is a block diagram of a system for implementing a device according to an embodiment of the present disclosure.

FIG. 5 is a block diagram of a computer system 500 suitable for implementing one or more embodiments of the present disclosure, including the service provider server 130, the merchant server 120, and the user devices 110, 180, and 190. In various implementations, each of the user devices 110, 180, and 190 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, 130, 180, and 190 may be implemented as the computer system 500 in a manner as follows.

The computer system 500 includes a bus 512 or other communication mechanism for communicating information data, signals, and information between various components of the computer system 500. The components include an input/output (I/O) component 504 that processes a user (i.e., sender, recipient, service provider) action, such as selecting keys from a keypad/keyboard, selecting one or more buttons or links, etc., and sends a corresponding signal to the bus 512. The I/O component 504 may also include an output component, such as a display 502 and a cursor control 508 (such as a keyboard, keypad, mouse, etc.). The display 502 may be configured to present a login page for logging into a user account or a checkout page for purchasing an item from a merchant. An optional audio input/output component 506 may also be included to allow a user to use voice for inputting information by converting audio signals. The audio I/O component 506 may allow the user to hear audio. A transceiver or network interface 520 transmits and receives signals between the computer system 500 and other devices, such as another user device, a merchant server, or a service provider server via a network 522, such as network 160 of FIG. 1. In one embodiment, the transmission is wireless, although other transmission mediums and methods may also be suitable. A processor 514, which can be a micro-controller, digital signal processor (DSP), or other processing component, processes these various signals, such as for display on the computer system 500 or transmission to other devices via a communication link 524. The processor 514 may also control transmission of information, such as cookies or IP addresses, to other devices.

The components of the computer system 500 also include a system memory component 510 (e.g., RAM), a static storage component 516 (e.g., ROM), and/or a disk drive 518 (e.g., a solid-state drive, a hard drive). The computer system 500 performs specific operations by the processor 514 and other components by executing one or more sequences of instructions contained in the system memory component 510. For example, the processor 514 can perform the content modification functionalities described herein according to the process 400.

Logic may be encoded in a computer readable medium, which may refer to any medium that participates in providing instructions to the processor 514 for execution. Such a medium may take many forms, including but not limited to, non-volatile media, volatile media, and transmission media. In various implementations, non-volatile media includes optical or magnetic disks, volatile media includes dynamic memory, such as the system memory component 510, and transmission media includes coaxial cables, copper wire, and fiber optics, including wires that comprise the bus 512. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 500. In various other embodiments of the present disclosure, a plurality of computer systems 500 coupled by the communication link 524 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
detecting that a content request has been made via an application of a user device associated with a user, wherein the content request is for displayable content from a third-party server based on a first set of criteria;
obtaining the displayable content from the third-party server, wherein the displayable content comprises a plurality of items related to a particular subject matter;
determining a goal of the user with respect to the particular subject matter, wherein the goal is associated with a set of metrics;
determining a level of advancement of the user with respect to the particular subject matter according to the set of metrics based on a consumption history of the user related to the particular subject matter;
determining a second set of criteria based on the goal and the level of advancement of the user;
modifying the displayable content based on the second set of criteria, wherein the modifying comprises eliminating, from the plurality of items, one or more items that fall beneath the level of advancement with respect to the particular subject matter by a threshold; and
causing the application to present the modified displayable content on the user device.

2. The system of claim 1, wherein the plurality of items in the displayable content is arranged according to the first set of criteria, and wherein the modifying further comprises re-arranging the plurality of items according to the second set of criteria.

3. The system of claim 1, wherein the modifying further comprises selectively highlighting a presentation of at least one item in the plurality of items based on the second set of criteria to visually indicate a relative importance of the at least one item in the plurality of items.

4. The system of claim 1, wherein the displayable content is a first displayable content, wherein the plurality of items is a first plurality of items, and wherein the operations further comprises:
retrieving, from the third-party server and based on the first set of criteria, second displayable content comprising a second plurality of items;
selecting, from the second plurality of items, a set of items based on the second set of criteria; and
adding the set of items to the first displayable content.

5. The system of claim 4, wherein the operations further comprise:
identifying the second plurality of items in the second displayable content using a screen-scraping technique.

6. The system of claim 1, wherein the modifying further comprises eliminating, from the plurality of items, one or more second items that exceed the level of advancement with respect to the particular subject matter by the threshold.

7. The system of claim 1, wherein the operations further comprise:
- selecting, from the plurality of items, a subset of items based on the level of advancement of the user; and
- determining an order for the subset of items for progressing toward the goal, wherein the modifying further comprises re-arranging the subset of items in the displayable content based on the order.

8. A method comprising:
- obtaining, by one or more hardware processors, displayable content from a third-party server, wherein the displayable content comprises items retrieved from the third-party server based on a first set of filtering criteria and intended for a first user of a first user account;
- determining a particular goal for the first user with respect to a subject matter associated with the items;
- determining a level of advancement of the user with respect to the subject matter based on a consumption history of the user related to the subject matter;
- determining a second set of filtering criteria based on the particular goal and the level of advancement of the user;
- modifying, by the one or more hardware processors, the displayable content based on the second set of filtering criteria, wherein the modifying comprises removing, from the items, one or more items that do not meet the level of advancement with respect to the subject matter by a threshold; and
- causing the application to present the modified displayable content on the user device.

9. The method of claim 8, wherein the particular goal is associated with a second user account that is linked to the first user account, and wherein a second user of the second user account is a co-worker of the first user within an organization.

10. The method of claim 8, wherein the first user account is associated with a first goal, wherein the first user account is linked to a second user account associated with a second goal, wherein the method further comprises:
- assigning weights to the first goal and the second goal; and
- determining the particular goal based on the weights assigned to the first goal and the second goal.

11. The method of claim 10, further comprising:
- determining a common attribute between the first goal and the second goal, wherein the second set of filtering criteria is determined further based on the common attribute.

12. The method of claim 8, wherein the particular goal is associated with a set of metrics, and wherein the level of advancement of the user is determined according to the set of metrics.

13. The method of claim 12, further comprising:
- selecting, among the items in the displayable content, a subset of items associated with advancing toward the particular goal for the first user; and
- determining an order for the subset of items based on an advancement toward the particular goal, wherein the modifying the displayable content is further based on the order.

14. The method of claim 13, wherein the modified displayable content indicates the order for the subset of items.

15. A non-transitory machine-readable medium having stored thereon machine-readable instructions executable to cause a machine to perform operations comprising:
- detecting a request to retrieve a set of items from a third-party website based on a first set of criteria by an application of a user device;
- obtaining the set of items from a third-party server associated with the third-party website;
- determining a user account associated with the user device, wherein the user account is associated with a goal;
- determining a level of advancement of a user of the user account toward the goal based on a content access history associated with the user account;
- determining a second set of criteria based on the goal and the level of advancement of the user;
- modifying the set of items based on the second set of criteria, wherein the modifying comprises removing, from the set of items, one or more items that do not meet the level of advancement with respect to the subject matter by a threshold; and
- causing the application to present the modified set of items on the user device.

16. The non-transitory machine-readable medium of claim 15, wherein the operations further comprise:
- selecting, from the set of items, a subset of items associated with advancing toward the goal for the user; and
- determining an order for the subset of items based on the second set of criteria, wherein the modifying the set of items further comprises re-arranging the set of items based on the order.

17. The non-transitory machine-readable medium of claim 15, wherein the operations further comprise selectively highlighting at least one item in the set of items based on the second set of criteria to visually indicate a relative importance of the at least one item in the set of items.

18. The non-transitory machine-readable medium of claim 15, wherein the set of items is a first set of items, and wherein the operations further comprise:
- retrieving, from the third-party server, a second set of items based on the first set of criteria; and
- selecting, from the second set of items, a second subset of items based on the second set of criteria, wherein the modifying further comprises adding the second subset of items to the first set of items.

19. The non-transitory machine-readable medium of claim 18, wherein the operations further comprise:
- identifying the second set of items based on using a screen-scraping technique on the third-party website.

20. The non-transitory machine-readable medium of claim 15, wherein the modifying the set of items further comprise removing, from the set of items, one or more second items that exceed the level of advancement with respect to the subject matter by the threshold.

* * * * *